US008819908B2

(12) United States Patent  (10) Patent No.: US 8,819,908 B2
Muxlow et al.  (45) Date of Patent: Sep. 2, 2014

(54) DIRECT DRIVE VARIABLE CRIMP ON FLANGE TOOL

(71) Applicant: Magna International Inc., Ontario (CA)

(72) Inventors: Fred Henry Muxlow, Ontario (CA); David Christopher Marchand, Ontario (CA)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/090,400

(22) Filed: Nov. 26, 2013

(65) Prior Publication Data

US 2014/0157560 A1  Jun. 12, 2014

Related U.S. Application Data

(63) Continuation of application No. 12/737,384, filed as application No. PCT/CA2009/000887 on Jun. 25, 2009, now Pat. No. 8,615,861.

(60) Provisional application No. 61/134,195, filed on Jul. 8, 2008.

(51) Int. Cl.
 *B23P 19/00* (2006.01)
 *B23P 19/04* (2006.01)

(52) U.S. Cl.
 CPC ................................. *B23P 19/047* (2013.01)
 USPC ........................ 29/243.58; 29/243.5; 72/211

(58) Field of Classification Search
 USPC ......... 29/243.5, 243.57, 243.58; 72/210, 211, 72/245; 81/301
 See application file for complete search history.

(56) References Cited

U.S. PATENT DOCUMENTS

| 3,773,005 | A | | 11/1973 | Day et al. |
| 4,648,208 | A | | 3/1987 | Baldamus et al. |
| 5,048,170 | A | * | 9/1991 | Kuppers ......................... 29/235 |
| 5,065,486 | A | * | 11/1991 | Goedderz ....................... 292/35 |
| 5,068,952 | A | | 12/1991 | Hennen |
| 5,864,933 | A | * | 2/1999 | Sheline ..................... 29/243.58 |
| 5,875,670 | A | * | 3/1999 | Stojkovski et al. ............. 72/211 |
| 5,940,950 | A | | 8/1999 | Galat |

(Continued)

FOREIGN PATENT DOCUMENTS

| EP | 0822019 | 2/1998 |
| GB | 2341412 | 3/2000 |

(Continued)

*Primary Examiner* — Lee D Wilson
*Assistant Examiner* — Tyrone V Hall, Jr.
(74) *Attorney, Agent, or Firm* — Dickinson Wright PLLC

(57) ABSTRACT

A crimping assembly is provided for securing a cover part to a structural member. The crimping assembly includes a housing, a drive shaft disposed within the housing and rotatable in a first direction, and a first roller fixedly secured to the drive shaft and rotatable therewith. The crimping assembly also includes a slide shaft disposed within the housing and rotatable in a second direction. A second roller is fixedly secured to the slide shaft and rotatable therewith. A drive mechanism is operably coupled to the drive and slide shafts to roll the first and second rollers over the cover part to secure the cover part to the structural member. A coupling mechanism is operably connected between the drive shaft and the slide shaft to allow movement of the slide shaft towards and away from the drive shaft during operation of the crimping assembly to accommodate variations in flange thickness.

13 Claims, 8 Drawing Sheets

(56) References Cited

U.S. PATENT DOCUMENTS

| | | | |
|---|---|---|---|
| 6,038,753 | A | 3/2000 | Willett |
| 6,691,388 | B1 | 2/2004 | Kuppers et al. |
| 6,978,650 | B2 | 12/2005 | Rosenau et al. |
| 7,134,306 | B2 * | 11/2006 | Muxlow et al. ............ 72/211 |
| 8,136,866 | B2 | 3/2012 | Broadhead |
| 2001/0013163 | A1 * | 8/2001 | Menguc ............ 29/235 |
| 2004/0177667 | A1 | 9/2004 | Rosenau et al. |
| 2004/0255634 | A1 * | 12/2004 | Muxlow et al. ............ 72/211 |
| 2006/0168809 | A1 | 8/2006 | McCarvill et al. |
| 2010/0300170 | A1 | 12/2010 | Bentoski et al. |
| 2011/0271503 | A1 | 11/2011 | Muxlow et al. |

FOREIGN PATENT DOCUMENTS

| | | |
|---|---|---|
| JP | 02-154320 | 6/1996 |
| JP | 10-166280 | 6/1998 |
| JP | 2002-525236 | 8/2002 |
| WO | PCT/GB99/02411 | 7/1999 |
| WO | WO 99/50083 | 10/1999 |
| WO | 03/037669 A1 | 5/2003 |
| WO | 2007/127980 A1 | 11/2007 |
| WO | 2007/131332 A1 | 11/2007 |

* cited by examiner

DIRECT DRIVE VARIABLE CRIMP ON FLANGE TOOL

CROSS REFERENCE TO RELATED APPLICATIONS

This Continuation application claims the benefit of U.S. application Ser. No. 12/737,384, filed Jan. 7, 2011, which is a National Stage of International Application No. PCT/CA2009/000887, filed Jun. 25, 2009, which claims priority U.S. Provisional Patent Application No. 61/134,195, filed Jul. 7, 2008. The disclosures of the above applications are incorporated herein by reference.

BACKGROUND OF THE INVENTION

The invention relates to a crimping assembly for securing a cover part to a structural member along an opening of a motor vehicle. More particularly, the invention relates to a crimping assembly having a first roller and a second roller that moves relative to the first roller to accommodate variations in structural member thickness.

SUMMARY OF THE INVENTION

According to one aspect of the invention, a crimping assembly is provided for securing a cover part to a structural member. The crimping assembly includes a housing, a drive shaft disposed within the housing and rotatable in a first direction, and a first roller fixedly secured to the drive shaft and rotatable therewith. The crimping assembly also includes a slide shaft disposed within the housing and rotatable in a second direction. A second roller is fixedly secured to the slide shaft and rotatable therewith. A drive mechanism is operably coupled to the drive and slide shafts to roll the first and second rollers over the cover part to secure the cover part to the structural member. A coupling mechanism is operably connected between the drive shaft and the slide shaft to allow movement of the slide shaft towards and away from the drive shaft during operation of the crimping assembly to accommodate variations in structural member thickness.

According to another aspect of the invention, a crimping assembly for securing a cover part to a structural member includes a housing, a drive shaft disposed within the housing and rotatable in a first direction, and a first roller fixedly secured to the drive shaft and rotatable therewith. A slide shaft is disposed within the housing and is rotatable in a second direction. A second roller is fixedly secured to the slide shaft and is rotatable therewith. A slider is disposed within the housing and fixedly secured to the slide shaft. The slider is movable relative to the drive shaft to set the distance between the first and second rollers. A drive mechanism is operably coupled to the drive shaft to rotate the drive shaft in the first direction. A coupling mechanism is operably connected between the drive shaft and the slide shaft to rotate the slide shaft in the second direction in response to rotation of the drive shaft in the first direction. The coupling mechanism allows movement of the second roller towards and away from the first roller during operation of the crimping assembly to accommodate variations in structural member thickness.

According to yet another aspect of the invention, a crimping assembly for securing a cover part to a structural member includes a housing, a drive shaft disposed within the housing and rotatable in a first direction, and a first roller fixedly secured to the drive shaft and rotatable therewith. A slide shaft is disposed within the housing and is rotatable in a second direction. A second roller is fixedly secured to the slide shaft and is rotatable therewith. A drive mechanism is operably coupled to the drive and slide shafts for rotation of the first and second rollers to secure the cover part to the structural member. A slider is disposed within the housing and is fixedly secured to the slide shaft. The slider is movable relative to the drive shaft to set the distance between the first and second rollers.

According to still another aspect of the invention, a crimping assembly for securing a cover part to a structural member includes a housing, a drive shaft disposed within said housing and rotatable in a first direction, and a first roller fixedly secured to the drive shaft and rotatable therewith. A slide shaft is disposed within the housing and rotatable in a second direction. A second roller is fixedly secured to the slide shaft and rotatable therewith. A drive mechanism is retained within the handle and operably coupled to the drive and slide shafts for rotation of the first and second rollers to secure the cover part to the structural member. A swivel coupling is disposed between the housing and the drive shaft to allow the housing to rotate 360 degrees relative to the drive shaft.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
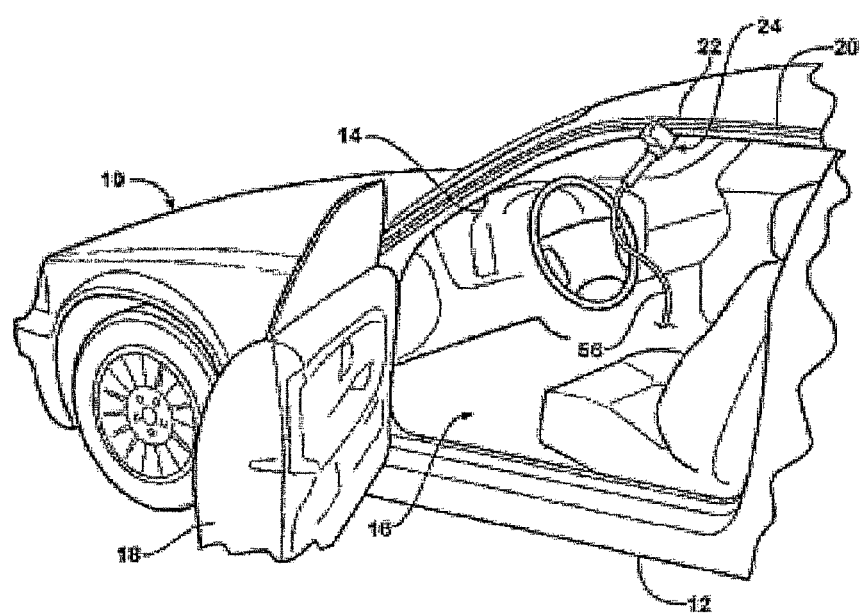
FIG. 1 is a fragmentary perspective view of a motor vehicle including a door for selectively closing an opening in a body portion.

Referring to FIG. 1, a motor vehicle 10 includes a body portion 12 defining an access opening 14 to a passenger compartment 16. A door 18 is pivotally coupled to the body portion 12 to selectively close the access opening 14. The body portion 12 includes a structural member 20 extending out from the body portion 12 along at least a portion of a periphery of the access opening 14. In one embodiment, the structural member 20 is a flange. It is, however, appreciated that the structural member 20 may be any of numerous structures.

A cover part 22 is secured to the flange 20 to provide an aesthetically pleasing appearance at the opening 14 when the door 18 is open. The cover part 22 generally includes an internal metal component that is molded inside a resilient outer component so that the metal component is not visible when the cover part 22 is secured to the flange 20. The outer component is formed from a rubber-like material that is used to seal the access opening 14 when the door 18 is closed thereagainst.

A crimping assembly, generally shown at 24, is provided to crimp the cover part 22 over the flange 20 to secure the cover part 22 thereto. More specifically, the cover part 22 includes spaced apart leg portions that are crimped against the flange 20 on either side thereof. The crimping assembly 24 applies a force inwardly against the cover part 22 on either side thereof after the cover part 22 is positioned over the flange 20. The crimping assembly 24 squeezes the cover part 22 around the flange 20.

Figure 2:
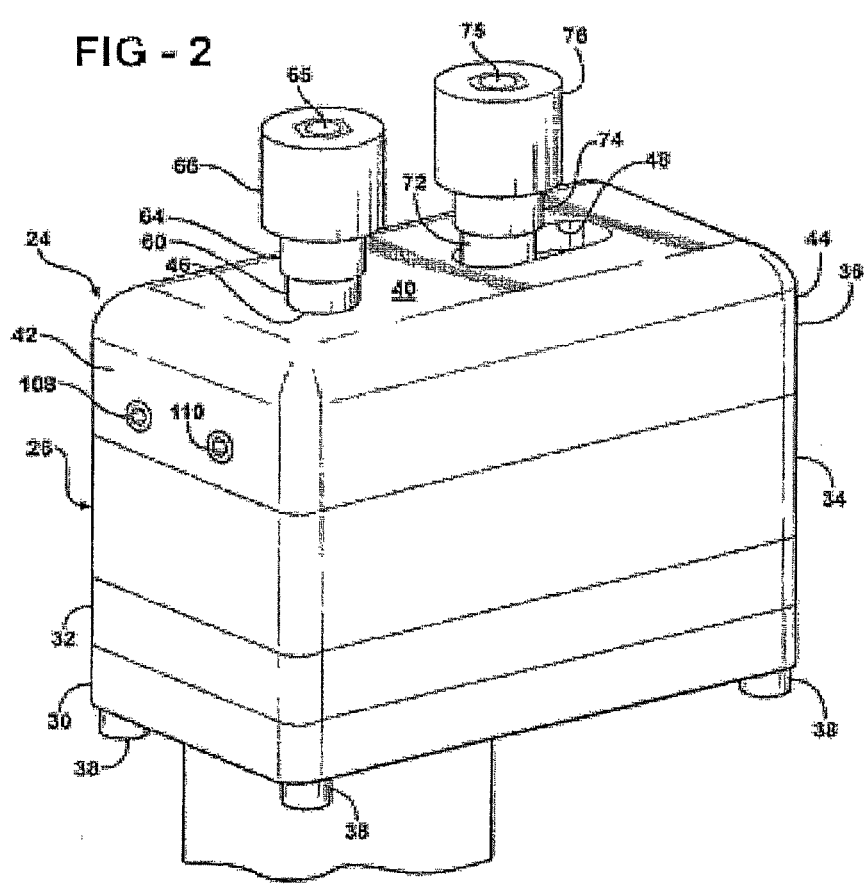
FIG. 2 is a fragmentary perspective view of a crimping assembly including a housing.
Figure 3:
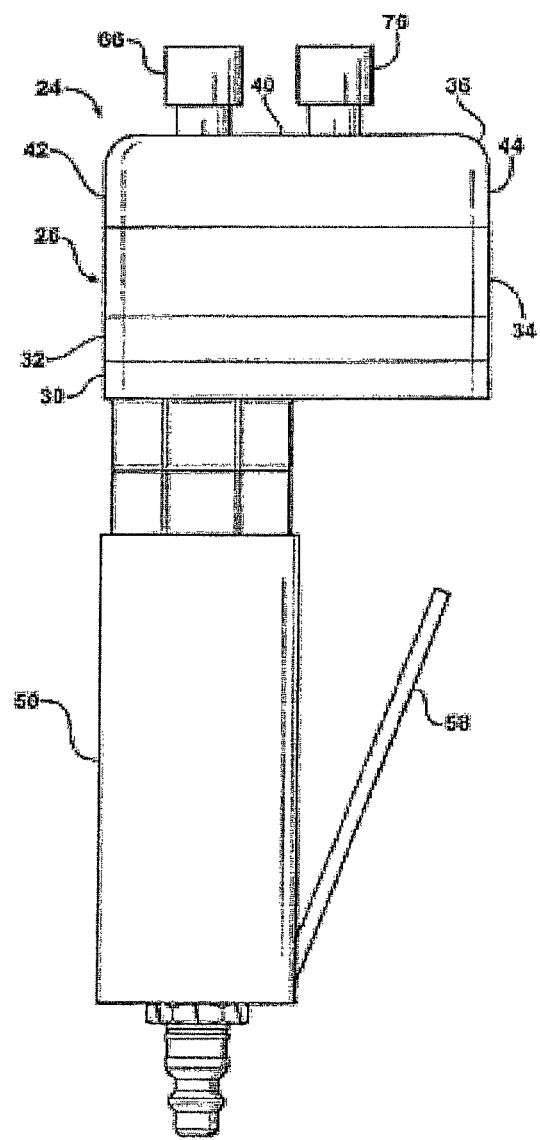
FIG. 3 is a top view of the crimping assembly.
Figure 4:
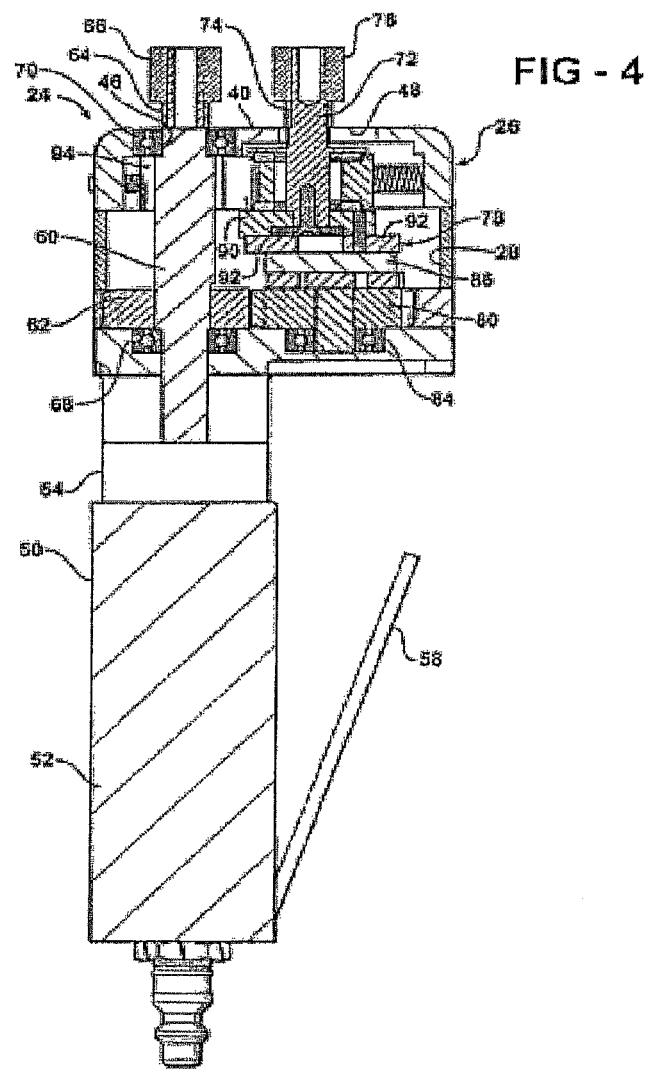
FIG. 4 is a cross-sectional view of the crimping assembly.

Referring to FIGS. 2 through 4, the crimping assembly 24 includes a housing or head, generally indicated at 26, defining an interior portion 28. In one embodiment, the housing 26 includes a bottom cap 30, a first compartment 32, a second compartment 34, and a top cap 36. The bottom cap 30, first 32 and second 34 compartments, and the top cap 36 are arranged in a stacked configuration, and are formed such that the interior portion 28 extends continuously from the bottom cap 30 to the top cap 36. A plurality of bottom screws 38 threadably engages each of the bottom cap 30, the first 32 and second 34 compartments, and the top cap 36 to fixedly secure the housing 26 together as a single component. It is also appreciated that the housing 26 of the crimping assembly 24 may be formed from less than or more than four components.

The top cap 36 of the housing 26 includes a leading surface 40 extending between a pair of spaced apart first 42 and second 44 end walls. The leading surface 40 defines an opening 46 and a slot 48 extending therethrough. The opening 46 and the slot 48 are spaced apart from one another along the leading surface 40 of the housing 26. It is, however, contemplated that the leading surface 40 may define a single elongated opening in place of the separate opening 46 and the slot 48.

The crimping assembly 24 includes a handle 50 coupled to the housing 26. A drive mechanism 52 is housed within the handle 50. In one embodiment the drive mechanism 52 is a pneumatic motor. The pneumatic motor 52 is operably connected to a transmission including an output gear 54. The pneumatic motor 52 is in communication with an airline 56 (shown in FIG. 1). The air line 56 receives compressed air from an air source and delivers the compressed air to the handle 50. The pneumatic motor 52 receives the compressed air and transforms the compressed air into rotation of the output gear 54. A trigger 58 is coupled to the handle 50. Upon activation of the trigger 58, the pneumatic motor 52 is actuated to initiate powered operation of the crimping assembly 24.

It is contemplated that the drive mechanism 52 is not limited to the pneumatic motor. For instance, in one embodiment the drive mechanism 52 could be an electric motor. And in another embodiment the drive mechanism 52 could be a battery, in which case the crimping assembly 24 would be a cordless device.

Figure 5:
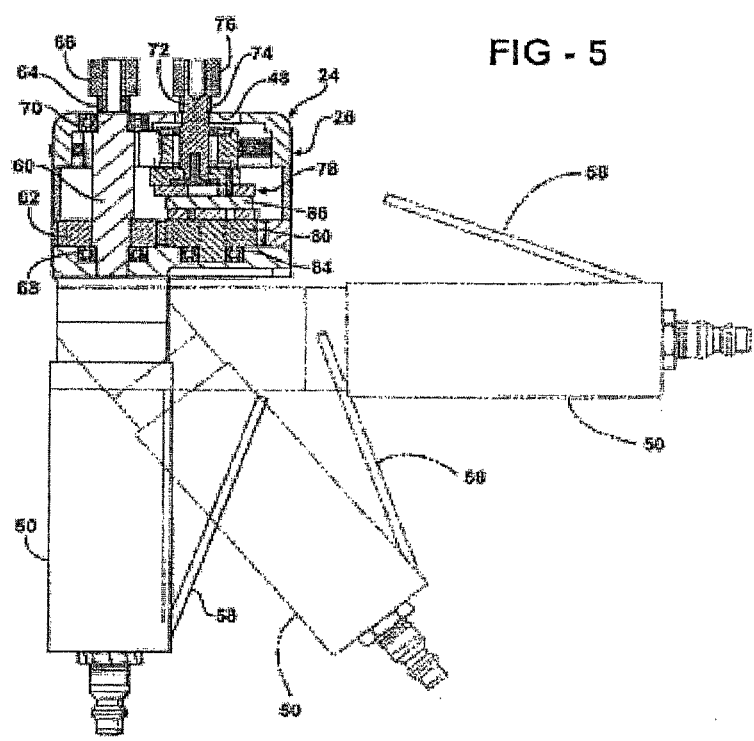
FIG. 5 is a cross-sectional view of the crimping assembly including alternative positions for a handle and pneumatic motor.

Referring to FIG. 5, the handle 50 including the pneumatic motor or drive mechanism 52 can be moved into various operating positions relative to the housing 26 to accommodate different flange configurations along the access opening 14. It is appreciated that the operating positions shown in FIG. 5 are exemplary and the particular position of the handle 50 and pneumatic motor or drive mechanism 52 relative to the housing 26 is not limited to the specific positions illustrated in FIG. 5.

Figure 6:
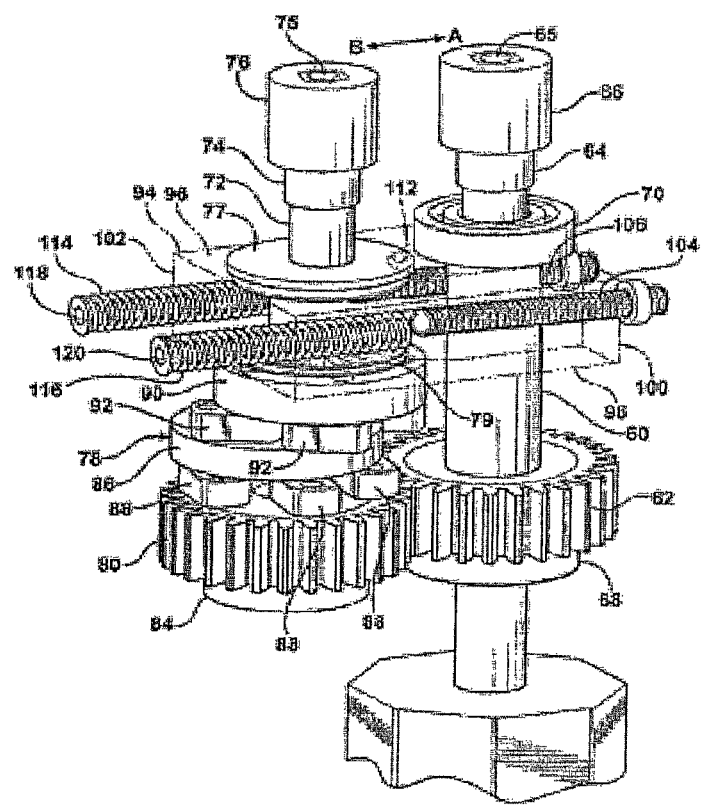
FIG. 6 is a fragmentary perspective view of the crimping assembly with the housing removed.
Figure 7:
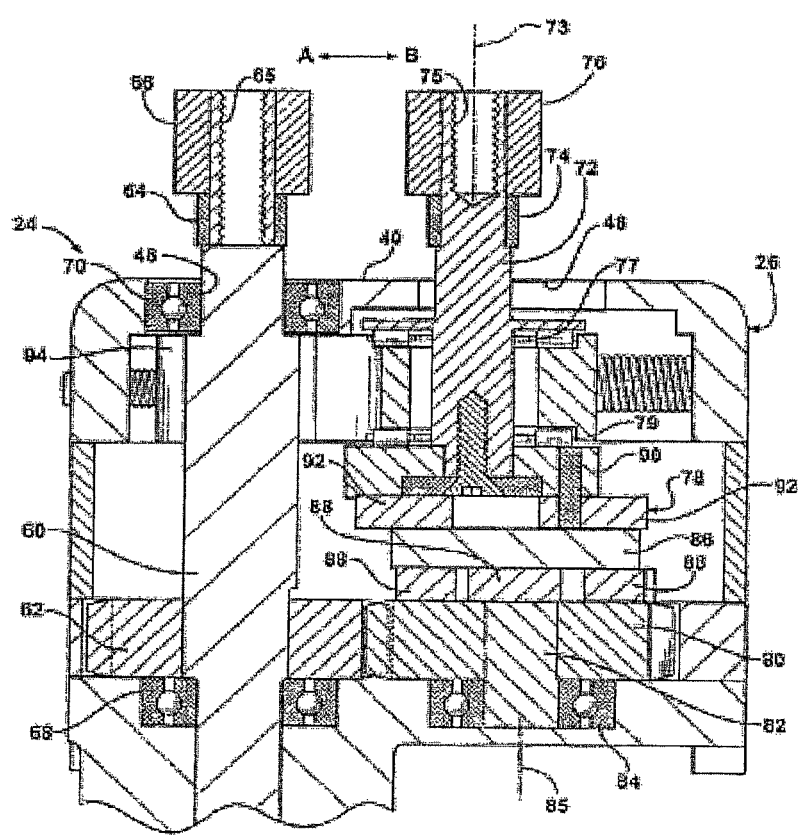
FIG. 7 is an enlarged cross-sectional view of the housing of the crimping assembly.

Referring to FIGS. 6 through 7, the crimping assembly 24 includes a drive shaft 60 operably connected to the output gear 54 and extending through the opening 46 along the leading surface 40 of the top cap 36. A drive gear 62 is fixedly secured to the drive shaft 60 at a location spaced apart from the output gear 54. A first roller 64 is fixedly secured to the drive shaft 60 at one end thereof by a roller screw 65. A roller pad 66 is fixedly mounted to the first roller 64. Upon actuation of the pneumatic motor 52, the drive shaft 60 rotates in a first direction and urges the drive gear 62 and first roller 64 to rotate therewith. A pair of support bearings 68, 70 is mounted along the drive shaft 60. One support bearing 68 is positioned adjacent the drive gear 62 and another support bearing 70 is positioned adjacent the first roller 64.

The crimping assembly 24 also includes a slide shaft 72 disposed within the housing 26 and spaced apart from the drive shaft 60. The slide shaft 72 extends through the slot 48 formed along the leading surface 40 of the top cap 36. A second roller 74 is fixedly secured to the slide shaft 72 by a roller screw 75. A roller pad 76 is fixedly mounted to the second roller 74. The slide shaft 72 rotates about a first axis of rotation 73. The slide shaft 72 rotates in a second direction opposite the first direction and urges the second roller 74 to rotate therewith. The slide shaft 72 is movable in the direction of arrows A and B to move the second roller 74 towards and away from the first roller 64. A pair of spaced apart thrust washers 77, 79 is disposed along the slide shaft 72.

A coupling mechanism, generally indicated at 78, is provided to operably couple the slide shaft 72 to the drive shaft 60. The coupling mechanism 78 includes a driven gear or input rotary member 80 in meshing engagement with the drive gear 62 such that rotation of the drive gear 62 in one direction will rotate the driven gear 80 in an opposite direction. The driven gear 80 is fixedly mounted along a driven shaft 82. A support bearing 84 supports one end of the driven shaft 82. The driven gear 80 and the driven shaft 82 rotate about a second axis of rotation 85. The second axis of rotation 85 is offset from the first axis of rotation of the slide shaft 72.

The coupling mechanism 78 also includes an intermediate rotary member 86 having a ring-like configuration. The intermediate rotary member 86 is rotatably coupled to the driven gear 80 by a first set of link members 88. More specifically, each one of the first set of link members 88 includes one end rotatably coupled to the driven gear 80 and an opposing end rotatably coupled to the intermediate rotary member 86. The coupling of the intermediate rotary member 86 to the driven gear 80 allows the intermediate rotary member 86 to rotate about an axis that is offset from the first 73 and second 85 axes of rotation.

The coupling mechanism 78 further includes an output rotary member 90 that is rotatably coupled to the intermediate rotary member 86 by a second set of link members 92. More specifically, each one of the second set of link members 92 includes one end rotatably coupled to the intermediate rotary member 86 and an opposing end rotatably coupled to the output rotary member 90. The coupling of the output rotary member 90 to the intermediate rotary member 86 via the second set of link members 92 allows the output rotary member to rotate about the first axis of rotation 73. The slide shaft 72 is fixedly secured to the output rotary member 90. As a result, the slide shaft 72 can rotate about the first axis of rotation 73 which is offset from the second axis of rotation 85. Thus, the coupling mechanism 78 provides for torque transfer from the driven shaft 82 to the slide shaft 72 even though the driven 82 and slide 72 shafts rotate about different axes of rotation. Such a coupling mechanism is commonly referred to as a Schmidt coupling.

The crimping assembly 24 further includes a slider 94 disposed within the top cap 36 of the housing 26 and movable relative to the top cap 36 in the direction of arrows A and B. The slider 94 includes a top surface 96 and a bottom surface 98. The slider 94 also includes first 100 and second 102 side walls spaced apart from one another by the top 96 and bottom 98 surfaces. The slide shaft 72 is fixedly secured to the slider 94 and extends through the top 96 and bottom 98 surfaces of the slider 94. Adjustment screws 104, 106 each extend through the first end wall 42 of the top cap 36 and into threaded engagement with the slider 94 at the first side wall 100 thereof. As a result, adjusting the adjustment screws 104, 106 causes the slider 94 to move relative to the housing 26. The movement of the slider 94 urges linear movement of the slide shaft 72 relative to the drive shaft 60 in the direction of arrow A or B to move the second roller 74 towards or away from the first roller 64. This linear movement of the slide shaft 72 is permitted by the configuration of the coupling mechanism 78. Access screws 108, 110 (shown in FIG. 2) are threaded onto one end of the respective adjustment screws 104, 106 and provide access thereto. The access screws 108, 110 are removed when adjustment of the second roller 74 is desired. The slider 94 includes an elongated shaft slot 112 formed along the top 96 and bottom 98 surfaces and extending therebetween. The drive shaft 60 is received within the elongated shaft slot 112. The elongated shaft slot 112 allows for movement of the slider 94 relative to the drive shaft 60.

The crimping assembly 24 includes biasing members 114, 116 that bias the slider 94 in the direction of arrow A, shown in FIG. 7, to urge the second roller 74 towards the first roller 64. Each biasing member 114, 116 is received within the slider 94 at the second side wall 102 thereof. Spring guide screws 118, 120 threadably engage the top cap 36 and extend into the slider 94 to retain the biasing members 114, 116 in place. The spring guide screws 118, 120 can be temporarily removed to facilitate the replacement of the existing biasing members 114, 116 with biasing members 114, 116 that exert more or less pressure. Because the crimping assembly 24 may be used in widely varying operating environments, there is no guarantee that the pressure delivered to the pneumatic motor 52 will remain consistent from time to time or place to place. As such, the crimping assembly 24 allows users to address such inconsistencies in pressure by determining the amount of pressure to be exerted by the biasing members 114, 116.

In operation, a user first establishes a minimum thickness of the flange 20 to ensure retention of the crimping assembly 24 therealong. The user adjusts the distance between the first 64 and second 74 rollers, also known as the pitch, so that the crimping assembly 24 at a start position will fit tightly around the flange 20. To adjust the pitch, the user removes the access screws 108, 110 to access the adjustment screws 104, 106. The user adjusts the adjustment screws 104, 106 to force the slider 94 to move in the direction of arrow A or arrow B. The movement of the slider 94 moves the second roller 72 either towards or away from the first roller 64. Once the desired pitch is achieved, operation of the crimping assembly 24 begins away from the flange 20 by squeezing the trigger 58 to activate the pneumatic motor 52. The pneumatic motor 52 causes rotation of the first roller 64 in a first direction via the drive shaft 60. At the same time, the second roller 74 rotates in a second direction via the coupling mechanism 78 and the slide shaft 72. The crimping assembly 24 is then brought to the flange 20 at a 45 degree angle until the first 64 and second 74 rollers make contact with the cover part 22 and the crimping assembly 24 rolls thereon. The crimping assembly 24 is rotated to a 90 degree angle relative to the flange 20 and moves along the access opening 14 while securing the cover part 22 to the flange 20. The crimping assembly 24 is eventually rotated back to the 45 degree angle and the crimping assembly 24 rolls off the cover part 22. The trigger 58 is then released to stop rotation of the first 64 and second 74 rollers.

As the crimping assembly 24 is moved along the access opening 14 to crimp the cover part 22 along the length of the flange 20, the coupling mechanism 78 allows the crimping assembly 24 to adjust to variation in the thickness of the flange 20 without stopping operation of the crimping assembly 24. If the thickness of the flange 20 increases at one or more points along its length, the second roller 74 is able to move away from the first roller 64 to accommodate any variation in width. This functionality is provided by the coupling mechanism 78 which allows the slide shaft 72 to float, that is, to move towards and away from the drive shaft 60 during operation of the crimping assembly 24. At the same time, the biasing members 114, 116 bias the second roller 74 towards the first roller 64 to ensure a tight fit between the crimping assembly 24 and the cover part 22. And in those instances when the thickness of the flange 20 decreases at one or more points along its length, the biasing members 114, 116 will bias the second roller 74 towards the first roller 64 to ensure the same tight fit between the crimping assembly 24 and the cover part 22.

In order to adjust the pressure provided by the biasing members 114, 116, the first 64 and second 74 rollers are first removed from the respective drive 60 and slide 72 shafts by removing the roller screws 65, 75. The plurality of bottom screws 38 is then unscrewed to allow removal of the top cap 36. The spring guide screws 118, 120 are removed and the slider 94 is removed from the top cap 36. The user is then able to replace the existing biasing members 114, 116 with replacement biasing members 114, 116 for lighter or heavier pressure.

Figure 8:
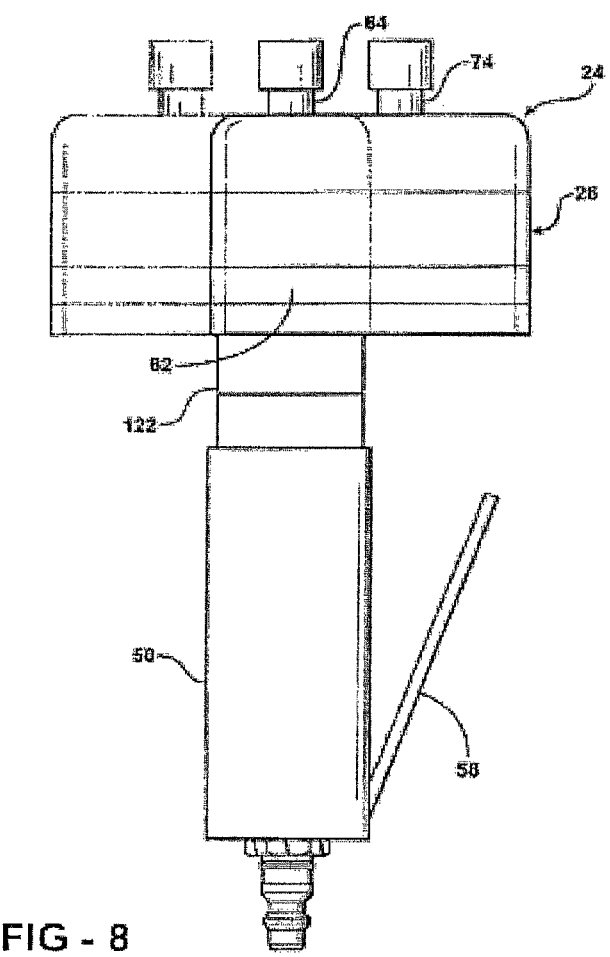
FIG. 8 is a cross-sectional view of the crimping assembly depicting the housing swiveling relative to the handle.

Referring to FIG. 8, in another embodiment the housing 26 of the crimping assembly 24 is able to swivel relative to the handle 50 to provide additional flexibility during operation of the crimping assembly 24. The crimping assembly 24 includes a swivel coupling 122 including a ball bearing disposed between the drive shaft 60 and the housing 26. The swivel coupling 122 allows the housing 26 to rotate 360 degrees relative to the drive shaft 60.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A crimping assembly for securing a cover part to a structural member, said crimping assembly comprising:
a housing;
a drive shaft disposed within said housing and rotatable in a first direction;
a first roller fixedly secured to said drive shaft and rotatable therewith;
a slide shaft disposed within said housing and rotatable in a second direction;
a second roller fixedly secured to said slide shaft and rotatable therewith;
a drive mechanism operably coupled to said drive and slide shafts for rotation of said first and second rollers to secure the cover part to the structural member; and
a drive gear operably coupled to said drive mechanism and fixedly secured to said drive shaft for rotation therewith in the first direction;
a slider fixedly secured to said slide shaft and movable therewith relative to said drive shaft to set the distance between said first and second rollers;
at least one biasing member biasing said slider and said slide shaft toward said drive shaft by applying pressure to said slider in an amount that allows said slide shaft to move relative to said drive shaft;
a coupling mechanism operably connected between said drive shaft and said slide shaft to allow movement of said slide shaft relative to said drive shaft for movement of said second roller towards and away from said first roller in order to accommodate variations in structural member thickness; and
wherein said coupling mechanism includes a driven gear engageable with said drive gear and operably coupled to said slide shaft, an output rotary gear fixedly secured to said slide shaft and operably coupled to said driven gear, an intermediate rotary gear operably coupled between said driven gear and said output rotary gear, and a first set of link members each having one end rotatably coupled to said driven gear and an opposing end rotatably coupled to said intermediate rotary gear to rotate said intermediate rotary gear in response to rotation of said driven gear.

2. The crimping assembly as set forth in claim 1 wherein said coupling mechanism includes a second set of link members each having one end rotatably coupled to said intermediate rotary gear and an opposing end rotatably coupled to said output rotary gear to rotate said output rotary gear in response to rotation of said intermediate rotary gear.

3. The crimping assembly as set forth in claim 1 including a handle fixedly secured to said housing and retaining said drive mechanism therein, said handle movable relative to said housing into various operating positions to accommodate different structural member configurations.

4. A crimping assembly for securing a cover part to a structural member, said crimping assembly comprising:
a housing;
a drive shaft disposed within said housing and rotatable in a first direction;
a first roller fixedly secured to said drive shaft and rotatable therewith;
a slide shaft disposed within said housing and rotatable in a second direction;
a second roller fixedly secured to said slide shaft and rotatable therewith;
a slider disposed within said housing and fixedly secured to said slide shaft and moveable therewith, said slider movable relative to said drive shaft to set the distance between said first and second rollers;
at least one biasing member biasing said slider and said slide shaft toward said drive shaft by applying pressure to said slider in an amount that allows said slide shaft to move relative to said drive shaft;
a drive mechanism operably coupled to said drive shaft to rotate said drive shaft in the first direction;
a drive gear operably coupled to said drive mechanism and fixedly secured to said drive shaft for rotation therewith in the first direction;
a coupling mechanism operably connected between said drive shaft and said slide shaft to rotate said slide shaft in the second direction in response to rotation of said drive shaft in the first direction, said coupling mechanism allowing movement of said second roller towards and away from said first roller during operation of said crimping assembly to accommodate variations in structural member thickness; and
wherein said coupling mechanism includes a driven gear engageable with said drive gear and operably coupled to said slide shaft, an output rotary gear fixedly secured to said slide shaft and operably coupled to said driven gear, an intermediate rotary gear operably coupled between said driven gear and said output rotary gear, and a first set of link members each having one end rotatably coupled to said driven gear and an opposing end rotatably coupled to said intermediate rotary gear to rotate said intermediate rotary gear in response to rotation of said driven gear.

5. A crimping assembly as set forth in claim 4 wherein said slide shaft rotates about a first axis of rotation.

6. The crimping assembly as set forth in claim 5 wherein said driven gear rotates about a second axis of rotation offset from said first axis of rotation.

7. The crimping assembly as set forth in claim 4 wherein said at least one biasing member has one end directly connected to said slider and an opposing end directly connected to said housing to urge said second roller towards said first roller to ensure a tight fit between said first and second rollers and the cover part.

8. A crimping assembly for securing a cover part to a structural member, said crimping assembly comprising:
a housing;
a drive shaft disposed within said housing and rotatable in a first direction;
a first roller fixedly secured to said drive shaft and rotatable therewith;
a slide shaft disposed within said housing and rotatable in a second direction;
a second roller fixedly secured to said slide shaft and rotatable therewith;
a drive mechanism operably coupled to said drive and slide shafts for rotation of said first and second rollers to secure the cover part to the structural member;
a drive gear operably coupled to said drive mechanism and fixedly secured to said drive shaft for rotation therewith in the first direction;
a slider disposed within said housing and fixedly secured to said slide shaft and moveable therewith, said slider movable relative to said drive shaft to set the distance between said first and second rollers;
at least one biasing member biasing said slider and said slide shaft toward said drive shaft by applying pressure to said slider in an amount that allows said slide shaft to move relative to said drive shaft;
a coupling mechanism between said drive shaft and said slide shaft; and
wherein said coupling mechanism includes a driven gear engageable with said drive gear and operably coupled to said slide shaft, an output rotary gear fixedly secured to said slide shaft and operably coupled to said driven gear, an intermediate rotary gear operably coupled between said driven gear and said output rotary gear, and a first set of link members each having one end rotatably coupled to said driven gear and an opposing end rotatably coupled to said intermediate rotary gear to rotate said intermediate rotary gear in response to rotation of said driven gear.

9. The crimping assembly as set forth in claim 8 wherein said driven gear is in meshing engagement with said drive gear.

10. The crimping assembly as set forth in claim 9 wherein said slide shaft is rotatable about a first axis of rotation.

11. The crimping assembly as set forth in claim 10 including a driven shaft fixedly secured to said driven gear, said driven shaft rotatable about a second axis of rotation offset from said first axis of rotation.

12. The crimping assembly as set forth in claim 8 wherein said at least one biasing member has one end directly connected to said slider and an opposing end directly connected to said housing to urge said second roller towards said first roller to ensure a tight fit between said first and second rollers and the cover part.

13. A crimping assembly for securing a cover part to a structural member, said crimping assembly comprising:
   a housing;
   a drive shaft disposed within said housing and rotatable in a first direction;
   a first roller fixedly secured to said drive shaft and rotatable therewith;
   a slide shaft disposed within said housing and rotatable in a second direction;
   a second roller fixedly secured to said slide shaft and rotatable therewith;
   a drive mechanism retained within said handle and operably coupled to said drive and slide shafts for rotation of said first and second rollers to secure the cover part to the structural member;
   a drive gear operably coupled to said drive mechanism and fixedly secured to said drive shaft for rotation therewith in the first direction;
   a swivel coupling disposed between said housing and said drive shaft to allow said housing to rotate 360 degrees relative to said drive shaft;
   a slider disposed within said housing and fixedly secured to said slide shaft and moveable therewith, said slider moveable relative to said drive shaft to set the distance between said first and second rollers;
   at least one biasing member biasing said slider and said slide shaft toward said drive shaft by applying pressure to said slider in an amount that allows said slide shaft to move relative to said drive shaft;
   a coupling mechanism operably connected between said drive shaft and said slide shaft; and
   wherein said coupling mechanism includes a driven gear engageable with said drive gear and operably coupled to said slide shaft, an output rotary gear fixedly secured to said slide shaft and operably coupled to said driven gear, an intermediate rotary gear operably coupled between said driven gear and said output rotary gear, and a first set of link members each having one end rotatably coupled to said driven gear and an opposing end rotatably coupled to said intermediate rotary gear to rotate said intermediate rotary gear in response to rotation of said driven gear.

* * * * *